United States Patent [19]

Reneau

[11] 4,050,720
[45] Sept. 27, 1977

[54] HOT TAP FOR PIPELINE
[76] Inventor: Bobby J. Reneau, P.O. Box 14, Bellaire, Tex. 77401
[21] Appl. No.: 657,356
[22] Filed: Feb. 12, 1976
[51] Int. Cl.² .............................................. F16L 35/00
[52] U.S. Cl. ..................................... 285/18; 285/156; 285/197; 285/323; 285/373; 285/DIG. 21
[58] Field of Search ................. 285/373, 18, DIG. 21, 285/156, 197, 198, 199, 323; 137/318, 315; 251/145, 146; 408/1

[56] References Cited
U.S. PATENT DOCUMENTS

| 2,050,985 | 8/1936 | Trickey | 285/199 X |
| 3,744,822 | 7/1973 | Arnold | 285/373 |
| 3,779,272 | 12/1973 | Dunmire | 285/197 |

Primary Examiner—Dave W. Arola
Attorney, Agent, or Firm—Donald Gunn

[57] ABSTRACT

Two embodiments of a hot tap are disclosed. In the first embodiment, a hot tap is formed around a pipeline. It includes an elongate sleeve divided into two semi-cylindrical portions. The two portions preferably bolt together. They divide along two lengthwise edges. In the lowermost half, stationary semicircular gripping devices for gripping the pipe are enclosed. They are formed as inserts in the lowermost portion. In the uppermost portion, a semicircular tapered wedge is included at the remote ends. The wedge is located adjacent to a movable tapered collet. It has a set of serrations or teeth which dig into the pipeline. The collet is driven lengthwise against the wedge by means of hydraulically actuated pistons and cylinders. The pistons and cylinders extend, thereby driving the collets against the tapered wedge to firmly grasp the outer surface of the pipe. This arrangement is located at both ends of the elongate cylindrical member. This secures and locates a laterally directed tubular member. It terminates in a flange plate and is adapted to support a drill motor and other mechanisms for puncturing the sidewall of the pipe to form the lateral connection. The lateral connection is formed inside of a hydraulically extendable circular member which has a seal means contacted against the wall of the pipe to be entered. In an alternative embodiment, the lateral tubular member through which the hot tap passage is formed incorporates concentric first and second pistons. They provide a new and improved seal arrangement which can be tested for leakage and which pressurizes seal members for complete sealing of the apparatus.

10 Claims, 5 Drawing Figures

HOT TAP FOR PIPELINE

BACKGROUND OF THE INVENTION

In the production of oil and gas at offshore locations or in swampy areas, a pipeline is normally laid from producing wells to some kind of production collection facility. Quite often, subsequent production developments necessitate placing a branch line to intersect the pre-existing pipeline. As an example, the production line first installed may be a 12 inch pipeline. It may be necessary to install a lateral connecting line of up to ten inches in diameter. It is difficult in some circumstances and sometimes impossible to retrieve the pre-existent line, raise it to a dry position, cut out a portion of line and splice in a tee fitting. The present invention is a hot tap appartus which is adapted to be installed at the point of intersection. It enables the intersecting line to be connected to the pre-existing line without raising of the pre-existing line. The hot tap thus enables the connection to be achieved without interrupting operation of the line. As a consequence, the connective operation can be achieved in situ at the convenience of the service personnel.

SUMMARY OF THE INVENTION

This invention is summarized as a hot top. It can be installed to connect a secondary line to a pre-existing line including swampy and undersea locations. The hot tap is formed of an elongate cylindrical member which fits on the exterior of a pipe to be tapped. The primary line is enclosed by an elongate cylindrical member which is divided lengthwise into two segments or halves. The two halves each have at their respective cylindrical ends means for gripping the exterior of the pipe. The two halves support an intersecting tubular member arranged at right angles. It is adapted to receive a cutting tool which punctures the sidewall of the primary pipeline. The lateral tubular member encloses a hydraulically actuated seal mechanism which is forced against the wall of the pipe to be punctured thereby providing an encircling seal around the cutting operation. Moreover, the seal is maintained to enable the apparatus to provide leakproof interconnections at the hot tap. Two embodiments are disclosed. In the first embodiment a single circular hydraulically actuated piston between two walls activates the seal mechanism on the exterior of the pipe to be cut, thereby perfecting the necessary seal. In the second embodiment, the seal is achieved by a pair of concentrically arranged circular cylinders which are likewise hydraulically actuated.

DESCRIPTION OF THE PREFERRED EMBODIMENT

Figure 1:
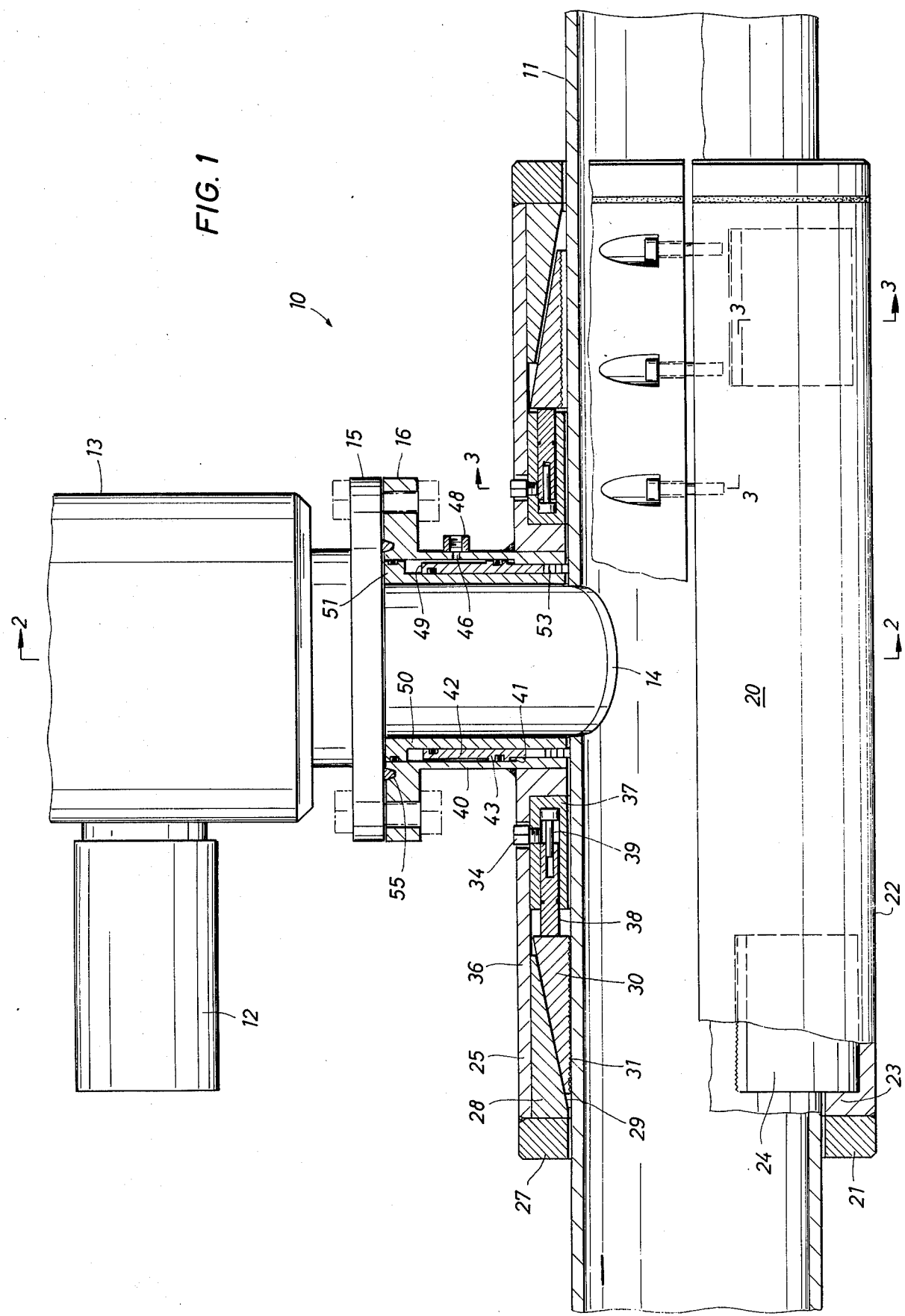
FIG. 1 is a lengthwise sectional view of a first embodiment of a hot top in accordance with teachings of the present invention particularly illustrating details of construction whereby the hot tap is fixed to the first pipe and a seal is perfected for the intersecting pipe.

Attention is first directed to FIG. 1 of the drawings where the numeral 10 identifies a first embodiment of the hot tap apparatus of the present invention. It is installed on a pre-existing pipeline 11. A lateral line (not shown) is connected at right angles to the hot tap mechanism 10. The lateral line must be somewhat smaller than the line 11. As an example, it can be one or two inches smaller in nominal diameter. This is appropriate so the first line is not drilled with a hole so large that it cuts away too much metal and thereby reduces the structural integrity of the device.

The hot tap incorporates a housing 12 which receives a drive motor. The motor has a shaft which extends into a chamber 13 where a bevel gear mechanism drives a cutting tool. The cutting tool is actuated towards the pipe 11 to cut an opening 14 in the pipe. The opening 14 provides access for the lateral pipe which is subsequently installed. The housing 13 is connected to a flange plate 15 which mates with and connects to a suitable matching flange 16. The hot tap apparatus 10 is left at the installation to structurally support the intersecting pipe relative to the first pipeline 11.

The hot tap apparatus 10 incorporates an elongate semi-cylindrical body 20. It is positioned on the lower side of the pipe 11, away from the intersecting pipe. It is semicylindrical in shape. It terminates at each end in an encircling ring-like member 21. The ring-like member 21 abuts against and reinforces the outer body shell 22. The body shell 22 terminates in an inwardly turned lip 23. The lip 23 defines an internal cavity. The cavity receives an insert 24. The insert 24 is circular at its innerface. The innerface of the insert is serrated to provide teeth which grip the pipe 11. This is duplicated at both ends of the equipment. The teeth preferably take a bite into the pipe so that it is held in fixed position. The insert 24 contacts the pipe 11 through almost 180% of arc of the pipe. It has a sufficient surface are a to provide adequate contact with the pipe. As shown more specifically in FIG. 3, the insert 24 is received in a recessed cavity and extends radially inwardly therefrom to engage and grip the pipe 11. It is preferable to use two or three separate inserts which comprise the whole of the insert and thereby provide an easier form of installation. The multiple inserts all are provided with the gripping teeth or serrations mentioned above.

Figure 2:
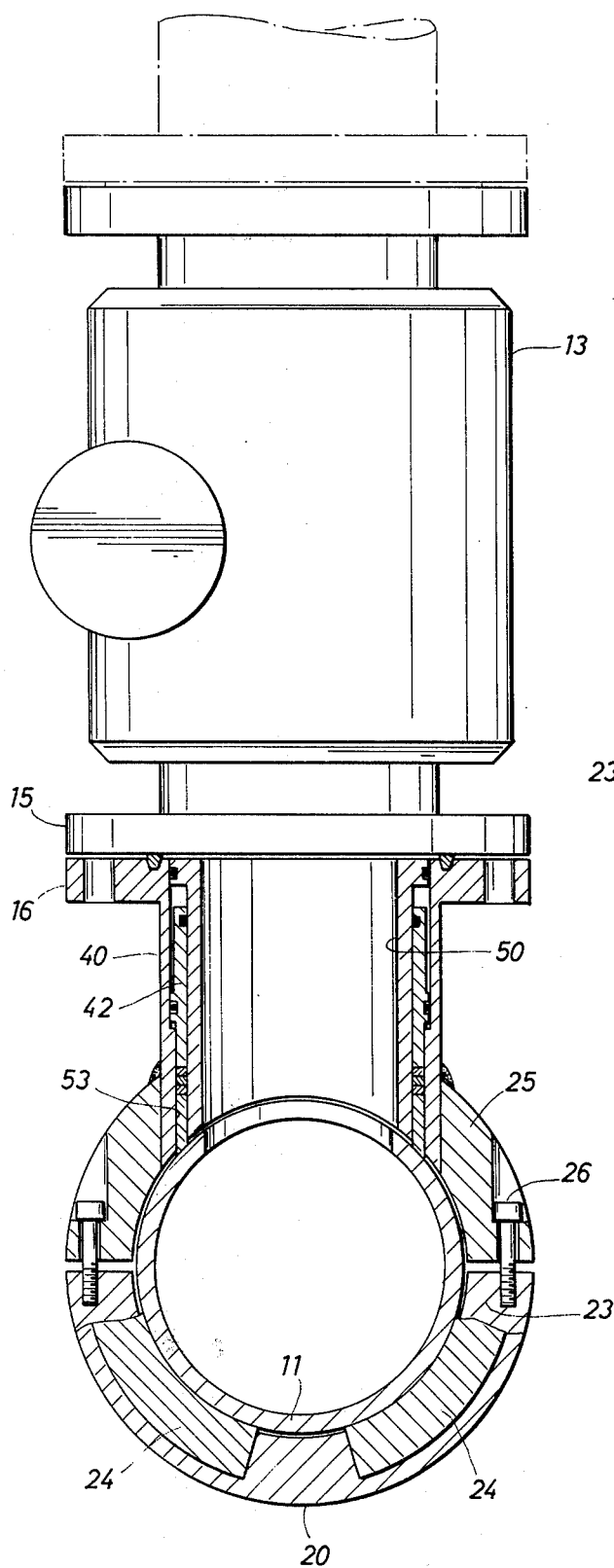
FIG. 2 is sectional view taken along the diameter of the intersecting pipe and particularly illustrating details of construction of the seal mechanism by which the intersecting pipe is sealed against leakage.

The semicylindrical elongate body 20 has an edge located shoulder or lip 23. This preferably extends along the righ and left hand ends and along the full length of the hot tap apparatus. The shoulder 23 is also shown in FIG. 2. The lower member 20 is drilled and tapped at many locations. This enables it to be joined to an upper mating member 25. As shown is FIG. 2, cap bolts 26 are threaded through the upper member 25 into the lower semicylindrical member 20. Several cap bolts are used. This pulls the two semicircular members 20 and 25 together and thereby enables the hot tap to be firmly fixed to the pipe 11. As shown in the drawings, the semicircular halves do not have to be sealed against the intrusion of seawater for an undersea installation; rather, they provide a structural hold and it is not necessary for them to provide a dry interior at this portion of the hot tap installation.

Figure 3:
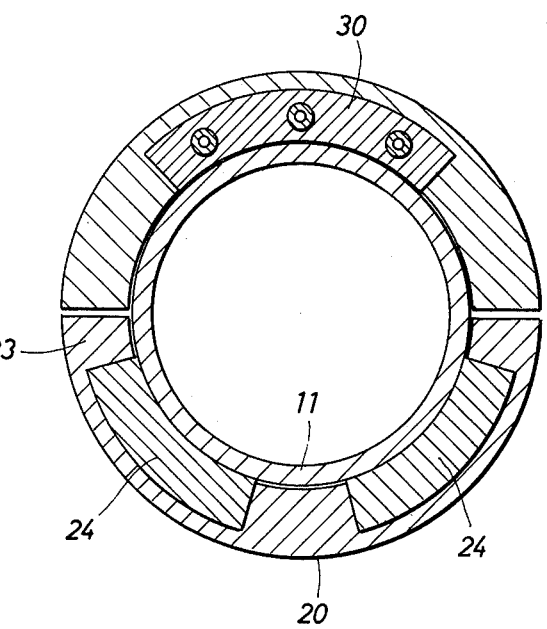
FIG. 3 is a sectional view along the line 3—3 of FIG. 2 showing details of construction of means for firmly engaging the first pipe.

Returning to FIG. 1 of the drawings, the upper half member 25 terminates at a reinforcing ring 27 which matches the half ring 21 shown in FIG. 1. This defines a semicircular internal cavity within the wall of the upper half member 25. It is used to receive and capture a tapered wedge 28. The wedge 28 has a face 29 which extends at a tapered angle. The wedge 28 encircles the pipe 11 through some inscribed angle. It is not necessary for it to encircle a full measure of 180°. Rather as shown in FIG. 3 of the drawings, it encircles a segment of about 90°. This is arranged at the top of the pipe 11, it being kept in mind that the insert 24 provide gripping of the pipe along the bottom which is concentric with a center plane through the apparatus of FIG. 3.

The tapered wedge 28 coacts with a movable collet means 30. The collet means 30 has a set of serrations 31 on its exposed face. The serrations 31 grip and dig into the surface of the pipe. The tapered collet has an arcuate extent around the pipe 11 which approximately matches that of the tapered wedge 28. The tapered collet 30 is jammed against the tapered wedge 28 which forces it radially inwardly into a gripping position. When it is forced axially of the hot tap apparatus, it is deflected inwardly to the gripping position. It will be observed that duplicate equipment is installed at the left and right hand ends of the hot tap and hence, a description of the equipment at one end will suffice as a description at the other end.

It is necessary to provide a motive force for the tapered slip 30 so it works against the tapered wedge 28. To this end, the numeral 34 identifies an alemite fitting which incorporates a check valve to enable hydraulic fluid to be forced into a closed chamber from a suitable pressure source. The upper half member 25 incorporates a cylindrical shell 36 which is the outer housing. A small space is located within the shell of the housing 36. An elongate hollow cylindrical member 37 is received in the space or volume within the shell 36. It is closed at one end and open at the other end. A rod 38 which serves as a piston rod is connected to the tapered collet 30. The rod 38 also serves as a piston, therebeing an o-ring seal means received on the rod to thereby prevent leakage along the rod. The cylinder thus defines a cavity which receives one end of the rod 38 which functions as a piston rod, thereby imparting a force to the tapered slips 30. Hydraulic fluid introduced through the fitting 34 thus flows into the cylinder 37 and impinges on the face of the rod 38 forcing the rod out of the cylinder. It will be observed that the fitting 34 is loosely received in a very large hole drilled through the shell 36. The fitting 34 is threaded into a tapped opening in the sidewall of the cylinder 37. The cylinder encloses a guide pin 39 which is loosely received in a loosely fitting guide hole in the rod 38.

Attention is directed to FIG. 3 of the drawings. FIG. 3 shows the incorporation of three hydraulic cylinders for actuation of the tapered collets 30. This more evenly distributes the activating force for the apparatus. The three hydraulic cylinders each have their own fitting to enable them to be connected to a pressure source. Preferably, they are pressurized in parallel to that their extension is achieved simultaneously.

Considering the hot tap as a whole, at the time of attachment, the cap bolts 26 are first pulled tight to encase the pipe 11 in the elongate cylindrical body. Thereafter, fluid pressure is applied to the hydraulic cylinders described above to create a clamping action which prevents slippage of the hot tap to the right or left. So to speak, the tapered wedges work against the serrated gripping inserts 24 which are opposite them. Moreover, the clamping action achieved at one end of the hot tap apparatus works against the clamping action at the opposite end. This thus fixes the apparatus so that the connective operation can be subsequently achieved and the intersecting pipe connected to the hot tap apparatus 10.

The upper half member 25 at approximately its center supports an intersecting cylindrical member at right angles. The cylindrical member 40 extends outwardly to the flange 16 which is integrally formed therewith. The cylindrical member 40 is welded to the upper half member 25. The cylindrical member 40 is provided with an internal shoulder 41. The shoulder 41 is located adjacent to a cylinder 42 which slides vertically in the fixed cylindrical member 40. The cylinder 42 is concentrically arranged on the interior of the cylinder 40. It has an encircling raised shoulder portion 43. The shoulder portion 43 receives an O-ring in an groove which fully encircles the apparatus. The seal prevents leakage of hydraulic fluid therepast. The shoulder portion 43 has an upper face and a lower face. The lower face is opposite the face 41. The shoulder portion 43 serves as a guide which aligns and limits the cylindrical member 42 as it moves upwardly and downwardly within the surrounding tubular member 40.

The tubular member 40 is perforated at 46. A suitable fitting 48 is welded to the exterior and surrounds te opening 46, thereby defining a path through which hydraulic fluid is introduced. It will be observed that the raised shoulder 43 defines the lower limits of travel of hydraulic fluid. Hydraulic fluid fills the narrow slot between the two cylindrical members 40 and 42 upwardly and impinges on the face 49 of the upper end of the cylinder 42. The cylinder 42 is slightly larger than a head sleeve 50. The head sleeve 50 is concentric of the cylinder and slides relative to it. It has a protruding outer lip 51. The lip 51 serves as a head closing over the cylindrical member 42. The head carries an O-ring in an encircling groove. The seal mechanism seals against the inside cylindrical passage drilled through the flange 16 which is coextensive with the tubular member 40. This defines a cylindrical cavity between the members 40 and 50 and below the head. This defines a volume therebetween where hydraulic fluid is introduced under pressure. The volume which is pressurized through the port 46 acts on the upper end face 49 of the member 42. The piston 42 is thus exposed to hydraulic pressure, thereby selectively forcing it downwardly as viewed in FIG. 1 of the drawings. It bears against several seal members 53. The seal members 53 are seal members which are pressure actuated to seal agains the outer surface of the pipe 11. It will be observed that they enclose the opening 14 which is formed the pipe 11. The seal members 53 are somewhat saddleshaped as may be observed viewing the shape of the hole 14 in FIG. 2. FIG. 2 further illustrates the seal members 53 with this type of construction.

The head sleeve 50 does not extend all the way to the pipe 11. Rather, it provides an actuating force for the seal members 53. The seal members seal about the opening 14 to prevent leakage. Rather, the entire flow is through the head sleeve 50. The head sleeve 50 is preferably captured by the flange 15. This prevents extruding the head sleeve 50 upwardly into the other portions of the equipment.

The flange plate 15 and 16 are sealed against leakage by a seal 55 between the two.

Ordinarily, a valve is included in the housing 13 to enable the lateral line to be selectively closed during the drilling operation. The valve enables the drilling equipment to be retracted. The valve also enables the lateral line to be selectively connected as indicated at the additional connective flanges shown in FIG. 2. Interestingly, the opening 14 does not have to match the size of the lateral line. Normally the opening 14 is as large as will be permitted by the pipe 11. If the nominal measure of the pipe 11 is 18 inches ID, the whole 14 has a maximum diameter of about 16 inches. This preferably is the optimum size, a larger hole damaging the structural integrity of the pipe 11 and a smaller hole being unnecessary. Even if the lateral line is only two or three inches in diameter, it is not particularly helpful to drill a smaller hole 14.

In operation, the hot tap is first fixed to the pipeline 11. This has been described in detail. Thereafter, pressure fluid through a check valve is applied to the piston 42. It is forced downwardly to activate the seals 53 thereby sealing around the location of the drilled opening 14. The drilling apparatus is then energized cutting the hole 14. The coupon which is cut from the hole is ordinarily held and grabbed by the cutting tool and is retrieved upwardly. This prevents damage inside the pipeline 11 by the coupon.

The hot tap 10 shown in FIG. 1 is used in the following manner. The location where a lateral line to be connected with the main line 11 is first determined. At this location, the lower half member 20 is positioned. It is positioned opposite of the lateral line location. Suppose for easy description that the main line 11 runs east and west while the lateral line to be connected approaches from the north. The lower half member 20 is thus positioned on the southside of the pipe 11. The upper half member 25 is positioned oppositely or on the north side of the line 11. The first step is to bolt the two halves together. When this is achieved, they are held in position. Hydraulic fluid is then applied to the fitting 34. The right and left ends of the equipment are pressurized. When this occurs, the tapered collects 30 are extended thereby grasping the pipe 11. It will be recalled that duplicate apparatus is used at the right and left hand ends of the equipment. As the equipment is pressurized, any axial movement of the hot tap 10 is neutralized because the movement occuring at both ends of the equipment, thereby fixing the hot tap in position. Referring to FIG. 3 of the drawings, it will be observed how the tapered collet 30 achieves a firm grip, taking a bite into the metal of the pipe 11 opposite of a pair of similar members which achieve a similar grip. Only one of the three is moved. After the collets firmly attaches the hot tap 10 to the pipe, pressure is applied through the connective fitting 48 and the inlet passage 46 in the fixed outer wall 40 to fill a chamber adjacent to the piston 42. The piston 42 is pumped against the wall of the pipe 11. The seals 53 are compressed. When they are compressed, they perfect an adequate seal around the hole 14 which is subsequently formed. The pressure applied to the piston 42 thus actuates the seal necessary to close the pipeline 11 against leakage from the hot tap apparatus.

The typical cutting tool used is inserted through the lateral to form the hole 14. The cutting tool is removed and the lateral line connection is made.

Figure 4:
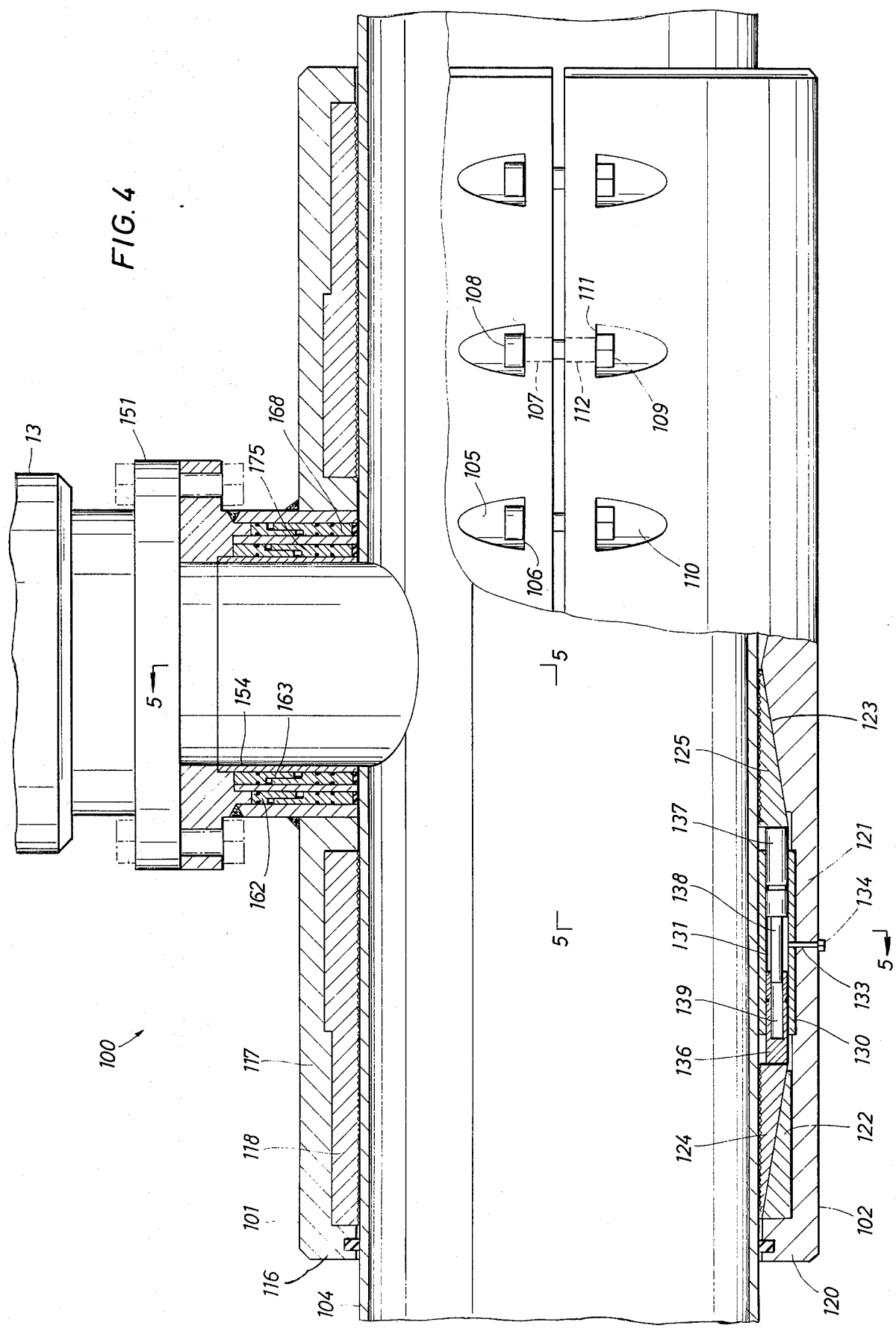
FIG. 4 is a view similar to FIG. 1 showing an alternative embodiment which incorporates a double seal mechanism for the intersecting pipe.
Figure 5:
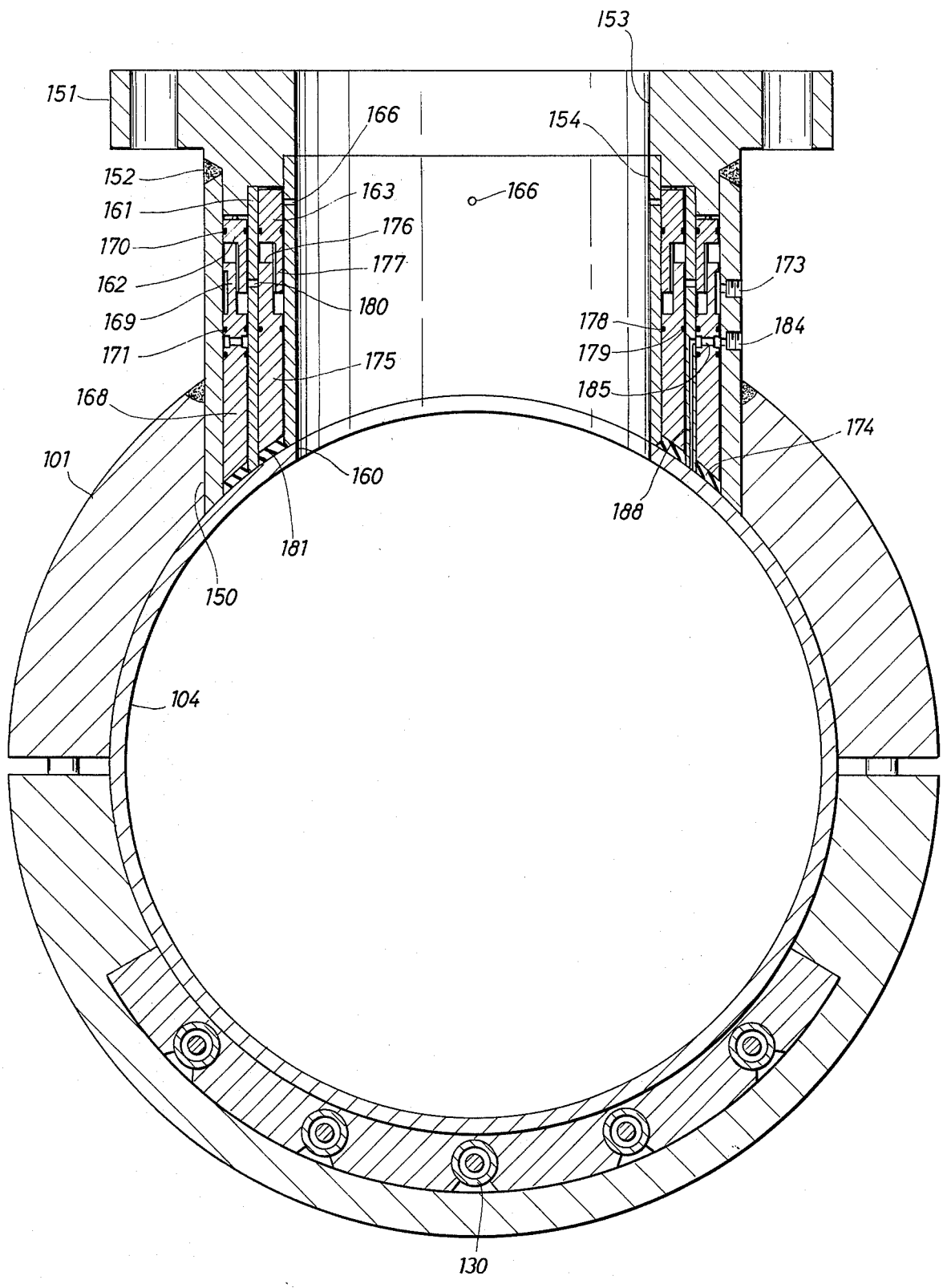
FIG. 5 is a sectional view along the line 5—5 of FIG. 4 showing in enlarged detail the construction of the double hydraulic cylinder arrangement whereby the intersecting pipe seal mechanism is completed.

Attention is next directed to FIGS. 4 and 5 of the drawings. They show an alternate embodiment which is indicated by the numeral 100. The embodiment 100 will be described and thereafter, its operation will be described. The embodiment 100 includes an upper member 101 and a lower member 102. The two together from an elongate cylindrical member encircling the pipe 104. The cylindrical member encloses the pipe 104 and is directed at a lateral pipe (not shown) which is to be connected to the pipeline 104. The embodiment 100 is oriented in the same manner as the embodiment 10 mentioned above. The upper half member 101 is provided with a fairly thick wall with tangental passages drilled at 105 which terminates at the shoulder 106. A hole 107 is drilled through at the shoulder 106. This is repeated at multiple occasions along both edges of the semi-cylindrical upper half 101. This enables a bolt 108 to be inserted through the hole 107 and a nut 109 is threaded on the bolt to pull the half members 101 and 102 together.

The lower half member 102 has tangentally drilled indentions 110 which terminates at a transverse shoulder 111. They too define the beginning of a drilled hole 112 which terminates at the shoulder 111. The bolt 108 extends to the drilled holes 107 and 112. As shown in the drawings, these are duplicated at matching locations along the side of each of the semicylindrical members 101 and 102. This enables the illustrated side and unillustrated side of the apparatus to be pulled snuggly together to fully encircle the pipe 104.

The upper half member has an enlarged shoulder 116 at its extreme end. It has a sidewall 117. The two together capture an insert 118. The insert 118 has a face which matches the outer face or wall of the pipe 104. That is to say, it has a radius of curvature enabling the insert 118 to contact the pipe 104. The insert 118 is equipped with a serrated face enabling it to take a bite into the pipe. It is possible for the insert to encircle almost 180 degrees but it is not neccessary. Typically, it is best that it encircle about 90° to 140° of the pipe when viewed on end.

In contrast with the embodiment 10, the upper half member of the embodiment 100 has a fixed serrated member having a gripping surface for engaging the pipe. Similar to the embodiment 10, duplicate equipment is included on the right and left ends of the embodiment 100 to hold it in the assigned position.

The lower half member 102 has an end located shoulder 120. The shoulder 120 is adjacent the sidewall 121 which defines an internal cavity. The cavity receives a fixed taper 122. A similar taper is found at 123. It is formed integrally with the wall 121. The two tapered surfaces are preferably inclined at equal angles with respect to the cylindrical body or wall 121. They preferably encircle the pipe 104 through at least about 90° to about 140°. It is not necessary that they encircle the pipe 104 any further than this. The tapered surfaces also have an equal slope or extent.

A movable tapered collet 124 is rested against the tapered surface 122. A similar tapered collet 125 is rested against the other tapered surface 123. They are constructed identically. Each is provided with a tapered smooth face. The tapered smooth face contacts the tapered surfaces 122 and 123 to enable them to slide. They are both provided with serrated inner faces. The serrations on the inner face are brought into contact with the pipe 104. Again, it is economical that they encircle about 90 to about 140 degrees of the pipe. A greater semi-circular extent is not normally necessary. The serrations take a bite into the pipe and hold it. The tapered surfaces are thus wedged against the pipe, thereby enabling the apparatus to seize and hold it against the pipe 104 when the tapered collects 124 and 125 are moved away from one another.

The numeral 130 identifies a hollow elongate cylinder which is spot welded in position as shown in FIG. 5 of the drawings. The cylinder 130 is open at both ends. The cylinder 130 has an internal chamber 131. A passage 133 communicates into the cylinder to introduce pressure fluid to the cavity 131. A fitting 134 holds pressure within the chamber 131.

A first piston 136 is received in the cylinder 130 at the left hand end. A second and similar piston 137 is received at the right hand end. They are identical in that they have a common external diameter and each is provided with a seal on the outer surface engaging the wall of the cylinder 130. The pistons 136 and 137 are adapted to extend from the cylinder 130 to contact the movable tapered slips 124 and 125 respectively. They move away from one another.

The piston 137 is provided with a guide rod 138. The piston 136 has a guide passage 139. The rod extends into the passage to guide the two for linear movement toward and away from one another. A loose fit is adequate so long as the rod is received in the axial passage 139.

The apparatus as described to this juncture is similar to the embodiment 10 in that it has hydraulically actuated serrated moveable collect members which bite or grip the pipeline 104. It is different in the provision of a duplicate set of equipment at each end of the hot tap 100. The duplicate set of equipment refers to the tapered collets 124 and 125. They are equally activated inasmuch as the pistons 136 and 137 have equal surface areas exposed to the pressure fluid in the chamber 131. As viewed in FIG. 4 of the drawings, the two pistons move apart, thereby forcing the tapered collets 124 and 125 lengthwise of the equipment. When this occurs, the serrations on the exposed faces engage and hold the pipe.

As shown in FIG. 5, the apparatus includes at least four or five spaced pistons. The tapered collects 124 and 125 have an arcuate extent such that it is desirable to apply force at three or four places around the equipment. In the illustrated embodiment, five are included but this number can be obviously varied.

Attention is next direct to FIG. 5 of the drawings for a description of the equipment which enables the lateral line to be connected and sealed. The upper half body 101 is joined to a lateral cylindrical member 150. The tubular member 150 extends upwardly to a flange 151 and is welded to it at 152. An axial passage 153 is defined interiorly of the flange which receives an internal sleeve 154. The sleeve 154 is captured against upward movement by an internal shoulder in the flange. Its downward movement is limited by the pipeline 104. The opening 160 into the pipe is cut inside the sleeve 154. The opening 160 can have a diameter equal to the sleeve 154 or it can be smaller. Downward movement of the sleeve 154 is thus limited by the pipeline itself. It is helpful that the sleeve 154 be contoured as shown in the cross sectional view of FIG. 5 to seat snugly against the pipe but it is not necessary to form a leak proof seal between the sleeve 154 and the pipe 104.

The sleeve 154 is concentric with outer cylindrical member 150. Between them, they capture a fixed tubular member 161. It is fixed in position at the upper end by an appropriate abutting shoulder on the flange 151 and extends downwardly against the pipe 104. Again, it rests against the pipe but is not necessary that a leak proof connection between the two be made.

The tubular members 150, 154, and 161 define two concentric cavities. They are limited at the upper end by abutting shoulders on the lower side of the flange 151. A first shouldered ring 162 and a second and similar shouldered ring 163 are received in the two circular spaces. They are constructed similarly. Each one has spaced beads or lugs on the upper face which contact the bottom face of the flange 151. This is shown in FIG. 5 for both the rings 162 and 163.

In effect, the members 162 and 163 serve as cylinder heads. They define below them a sealed chamber where a piston is free to move. Small openings 166 open to the top end of the cylinder heads 162 and 163. This enables pressure from flow through the lateral line to enter the openings 166 and impinge on the piston heads 162 and 163 at the top end. This top end exposure is further enhanced by the fact that the sleeve 161 between the tube is not welded or otherwise fixed to the flange. It is merely nested against it on the interior of the protruding lip just above the cylinder head 162. The head 162 is thus exposed to the pipeline pressure through the small opening 166, over the top side of the head 163, through the slot where the sleeve 161 is nested against the flange 151, and to the top side. This enables pipe line pressure to increase the quality of the seal of the apparatus as will be described.

It will be observed that each piston head is provided with a step on its lower side or face. The step is there to align the pistons which are located below. The piston head 162 is thus located above the piston 168. The piston 168 is a cylindrical sleeve which is located between the outer fixed member 150 and the inner sleeve 161. It is equipped with an upwardly protruding lip 169 which extends into a telescoping relationship relative to the piston head 162. A space or void is defined between the two for receiving pressurized fluid. The piston head 162 supports o-ring seal members which fully encircle the piston head as indicated at 170. These o-rings define a fluid chamber below the piston head 162. In like fashion an o-ring 171 encircles the piston on its exterior surface. This defines the lower limit of the chamber where pressure fluid is introduced. The o-ring seals 170 and 171 are on the exterior bearing against the outer wall 150. The inner wall which is defined by the member 161 likewise is contacted by encircling the o-ring seals.

The numeral 173 identifies an inlet port which introduces fluid under pressure between the piston head 162 and the piston 168. It is isolated by o-rings 170 and 171 mentioned above so that the fluid pressure impinges on the upper end of the piston 168. When this occurs, the piston is forced downwardly. This piston head 162 is normally forced upwardly. In the event that pipeline pressure is introduced to the top end of the piston head 162, it imparts an additional downward force on the piston 168.

The piston 168 is shaped at its lower end to conform with the shape of the pipe 104. A seal 174 is caught between the fixed outer tubular member 150 and the intermediate tubular member 161. The seal 174 is a pressure actuated seal. As will be observed from the intersection of the cylinders which define it, it is shaped somewhat in the form of a saddle which fits against the wall of the pipe 104 beneath the piston 168.

The piston 168 thus sets or actuates a first pressured seal. This isolates the opening 160 which is cut in the pipeline. More importantly, it prevents leakage so that all flow from the opening 160 is directed through the lateral line out through the flange 151. The flange is used to connect with a cutting tool as previously described. Also a valve is normally used in conjunction with the cutting tool.

The piston head 163 is located above a second piston 175. It is similar to the piston 168, differing only in dimensions. They are similarly constructed. That is, it is equipped with an upstanding lip 176 which telescopes over a downwardly extending shoulder 177 of the piston head 163. Fluid introduced into the gap between the piston head and the piston 175 forces them apart. To this end, the piston head 163 has on its inner and outer faces fully encircling seal members such as o-rings which seal respectively against the fixed intermediate tubular member 161 and the smaller fixed internal member 154. This also isolates the top end of the piston head to enable it be actuated by pressure introduced from the pipeline. The piston head 163 and the piston 175 telescope toward and away from one another guided by the overlapping concentric members 176 and 177.

The piston 175 supports encircling o-rings 178 and 179. They again isolate the chamber between the piston and the piston head. They prevent leakage along the sidewalls which define that chamber. As previously mentioned, the larger piston 168 is pressure actuated through pressure fluid applied through a fitting or opening at 173. The intermediate tubular sleeve 161 has a number of openings 180 at spaced locations at the same elevation. They communicate from the outer piston to a point between the piston head 163 and the piston 175. Thus, the outer piston is pressurized and the smaller piston is similarly pressurized. Fluid introduced through the first cylinder thus flows into the second cylinder and actuates the piston 175. The two are serially operated. The piston 175 is positioned above its own seal 181. The seal 181 is smaller than the seal 174. Other than the dimensional difference, they function in the same manner. When the piston 175 is forced downwardly, it perfects the seal 181, thereby closing the lateral line to leakage at the hot tap 100.

As described above, the two pistons are serially actuated from the same fluid source. In addition, the piston heads are likewise exposed to the pressure occurring in the pipeline to thereby force them and the pistons downwardly. This further enhances the quality of the seal. It makes the seal achieved by the hot tap proportionate to the pipeline pressure. This is an enhancement inasmuch as the need for a quality seal is reduced when line pressure is low and increases with line pressure.

It will be observed that the seals 174 and 181 are isolated from pressure fluid above. If any fluid is found in their vicinity, it is the result of leakage. As a test vehicle, an opening 184 is incorporated. It opens into the larger piston 168. The larger piston 168 is perforated at spaced locations having a common elevation, several occurrances about the full circle thereof, by small passages 185. The passages 185 communicate through the piston 168. The passages 185 are isolated by four o-ring seal members, two above and two below, and two arranged on the internal face of the cylindrical piston 168 and two on the external face. This prevents leakage past the designated route. The lateral ports 185 open into a small passage 188. The passage 188 is fully within the wall of the intermediate tubular member 161. At the illustrated elevation, the passage 188 turns radially outwardly to align itself between the seals above and below the lateral passage 185. The passage 188 extends to the bottom of the tubular member 161. There, it is exposed to any fluid in the vicinity of the seals 174 and 181.

The passage 188 permits any fluid in the vicinity of the seals to be tapped and directed outwardly through the opening 184. There, a test instrument can be attached. The rate of flow or the pressure of any leakage fluid can be determined. Slight seepage can be tolerated for instance. Larger flow rates indicate an ineffective seal. An ineffective seal can be overcome by increasing the pressure applied to the port 173 to further actuate the pistons 168 and 175.

It is believed that the operation of the hot tap 10 will be understood from the discription made above. It is normally installed and left indefinitely. The lateral line is connected typically through connecting flanges and are left at the tee connection achieved by the hot tap 100. The hot tap 100 is useful both above and below water. It is particularly intended as a below water hot tap.

The differences in the embodiment 10 and 100 are believed to be readily understood. The foregoing is directed to the alternate preferred embodiments of the present invention but the scope is determined by the claims which follow.

I claim:
1. A hot tap apparatus for connecting a lateral line into a main pipeline, comprising:
   an elongate encircling housing adapted to be positioned around a main pipeline;
   a laterally directed connective means joined to said housing comprising;
   three concentrically arranged cylinders which define two cylindrical cavities which are closed transversely above and remote from an encircling seal means within each such cavity and adapted to seal against the surface of the main pipeline;
   a movable piston in each of said cavities bearing against said encircling seal means to compress said encircling seal means against surface of said main pipeline; and
   means for actuating said pistons to cause said pistons to bear against said encircling seal means and acute said encircling seal means into sealing contact with the main pipeline surrounding the hole formed in the main pipeline, thereby isolating the hole for flow through said laterally directed connective means and the lateral line.

2. The apparatus of claim 1 wherein said piston is a movable encircling structure received within said laterally directed connective means which is circular in transverse section and said piston is received in a cylinder which cylinder has the form of an encircling chamber about said laterally directed connective means.

3. The apparatus of claim 2 wherein said cylinder is defined by a pair of spaced apart cylindrical walls concentrically arranged relative to one another to define a circular cavity and further including a transversely extending head closing one end of said cavity.

4. The apparatus of claim 1 including first and second main pipeline gripping means which are arranged upstream and downstream of said laterally directed connective means for gripping and fixing the housing in position relative to the main pipeline.

5. The apparatus of claim 4 wherein said gripping means includes a radially expandable collet positioned adjacent to a tapered surface which collet moves respectively lengthwise of said tapered surface between first and second positions, the first position being relaxed and enlarged and the second position being contracted against the main pipeline to cause said collet to grip the main pipeline.

6. The apparatus of claim 5 including a piston means received in a co-acting cylinder means which is closed at one end to receive pressure fluid therein, said piston means moving in response to fluid pressure, and means imparting movement of said piston to said collet to move it lengthwise of said collet.

7. The apparatus of claim 5 wherein said collet is formed of two or more portions, each portion respectively received in said first or second shells, and said collet is serrated to enable movement into a gripping contact with the main pipeline with a set of serrations on said collet portions.

8. The apparatus of claim 1 including
a cavity means in said laterally directed connective means, and wherein said piston is fluidly actuated within said cavity;
transverse head means closing said cavity at one end of said cavity; and
duplicate pipe gripping means in said housing, one arranged upstream and the other arranged downstream of said laterally directed connective means, each of which slidably engages the main pipeline and which are constructed and arranged to work against one another in creating an axial load on gripping the pipe.

9. Hot tap apparatus for connecting a lateral line into a main pipeline which comprises:
an encircling housing adapted to be positioned around a main pipeline;
a laterally directed connective means supported by said housing and opening into the main line upon the drilling of a hole in the main line aligned with said laterally directed connective means;
encircling seal means which are sealingly received in said laterally directed connective means and which seal means are adapted to seal against the surface of the main pipeline;
a movable piston in an encircling cylindrical cavity in said laterally directed connective means and which piston bears against said seal means; and
means for introducing hydraulic fluid above said piston to move said piston against said seal means to actuate said seal means into sealing contact with the main pipeline surrounding the hole formed in the main pipeline and said laterally directed connective means and thereby isolating the hole for flow through said laterally directed connective means and the lateral line.

10. The apparatus of claim 9 wherein said piston is a movable encircling structure received within said laterally directed connective means which is circular in transverse section and said piston is received in a cylinder which cylinder has the form of an encircling chamber about said laterally directed connective means, and said chamber has an opening thereinto for introducing hydraulic fluid above said piston for fluid actuation thereof.

* * * * *